Patented July 24, 1928.

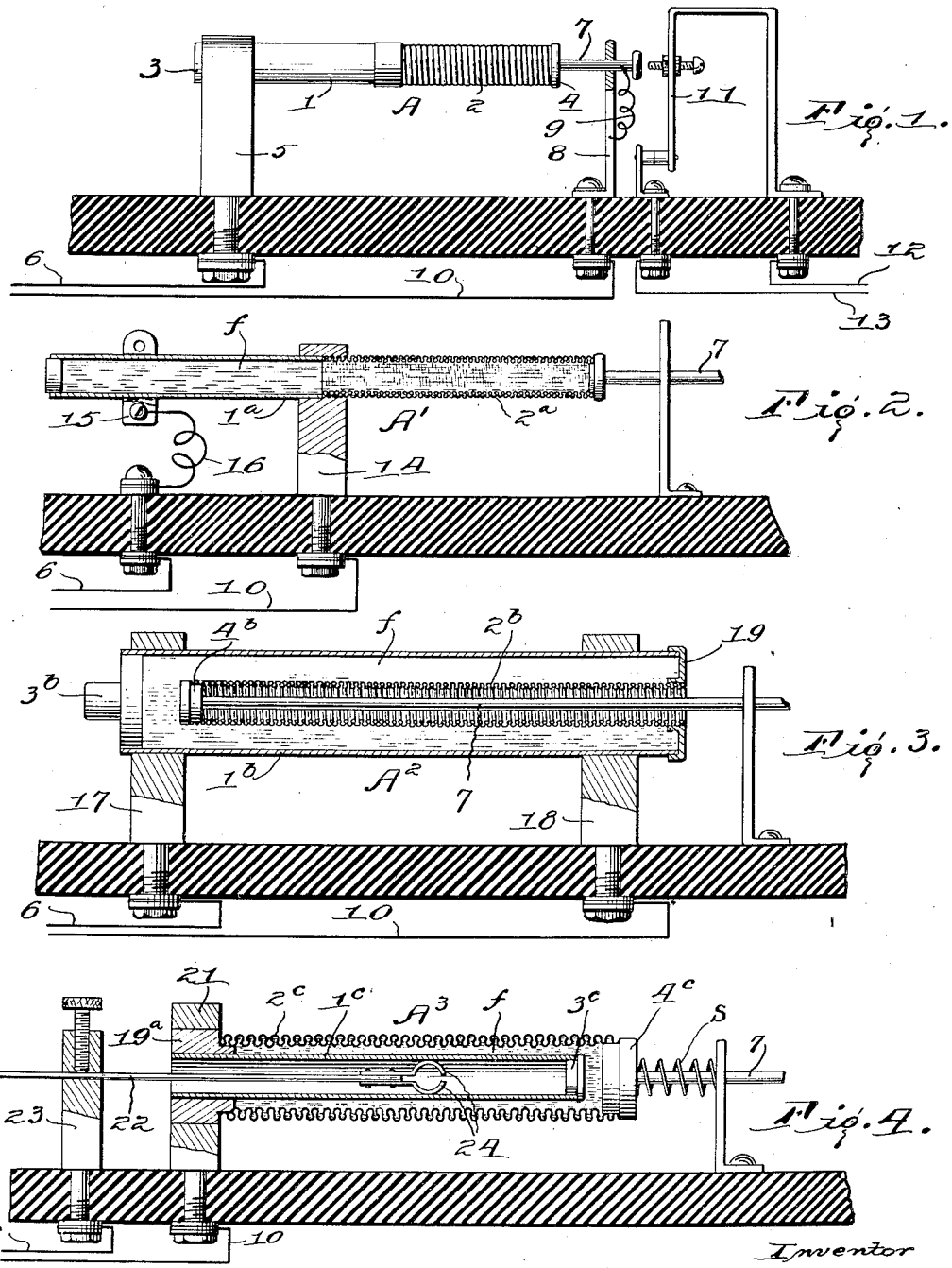

1,678,372

UNITED STATES PATENT OFFICE.

GEORGE H. WHITTINGHAM, OF BALTIMORE, MARYLAND, ASSIGNOR TO MONITOR CONTROLLER COMPANY, OF BALTIMORE, MARYLAND, A CORPORATION OF MARYLAND.

ELECTRICALLY-OPERATED THERMOSTAT.

Application filed June 2, 1921. Serial No. 474,383.

This invention relates to an electrically operated thermostat. In my co-pending application, Serial No. 401,051, filed August 3, 1920, I have shown a thermostat consisting of a thin, annularly corrugated metal tube, closed at its ends and containing an expansible liquid, and connections for passing an electric current through the wall of the tube, the arrangement being such that an excessive current passing through the metal of the tube will cause it to heat, and the heat imparted to the liquid will cause forcible expansion of the tube. In one form of the invention shown in said application, the wall of the chamber enclosing the liquid is composed of a plurality of expansible sections, of thin metal, connected by sleeves of high resistance metal, and current flows through the entire wall, the high resistance sleeves being for the purpose of giving a greater heating effect than could be obtained by making the entire wall of a copper alloy, such as is usually employed for corrugated expansion tubes. In the present invention, I provide an annularly corrugated tube of thin metal, capable of expanding and contracting to a considerable extent, axially, and connect to this a tube of high resistance metal which constitutes the heating element of the thermostat. The two tubes are joined fluid-tight and have closed ends and constitute a closed chamber, filled with an expansible liquid. When the high resistance section of the chamber is heated by the electric current, the liquid within the chamber expands forcibly and causes expansion of the corrugated section. Terminals are provided for connecting the high resistance section of the chamber in an electric circuit, and by adjusting one of these terminals the amount of resistance in circuit may be regulated as desired. The thermostatic device may be used for various purposes, as for opening or closing a switch, according to the variations in the current flowing through the high resistance section.

In the accompanying drawing,

Fig. 1 is a side elevation, partly broken away, of a thermostat embodying my invention, this thermostat being shown in association with an electric switch;

Fig. 2 is a similar view of a modification, the tubes being shown in longitudinal section;

Fig. 3 shows in longitudinal section a modification in which the expansion section is arranged within the high resistance or heating section;

Fig. 4 is a similar view showing the high resistance section arranged within the expansion section.

Referring to Fig. 1 of the drawing, A represents a thermostat comprising a closed chamber consisting of a composite tube having a section 1 of relatively thin high resistance metal, and a section 2 which is annularly corrugated in order that it may expand and contract axially to a considerable extent. These sections are connected end to end, as shown, and the outer ends of the composite tube are closed by plugs 3 and 4. The chamber thus formed contains an expansible liquid which becomes heated when the wall of the chamber is heated by the passage of the electric current through said wall. This liquid is preferably carbon tetrachloride. In Fig. 1, the high resistance section is mounted in a suitable metal support 5, which constitutes a terminal to which one wire 6 of an electric circuit is connected. A rod 7 extends outwardly from the closed end of the expansion section and is slidably mounted in a support or bearing 8 and connected by a flexible conductor 9 to said bearing which constitutes a terminal to which the other wire 10 of the electric circuit is connected.

With this arrangement, the current flows through the walls of both sections of the chamber and the passage of the current through the high resistance section causes said section to heat and the liquid within the chamber becomes heated by contact with said section. This liquid expands with the heat and causes a forcible extension of the expansion section, and this movement may be utilized for any purpose, as for moving the switch arm 11 to open an electric circuit 12—13.

In Fig. 2, the thermostat A' comprises the high resistance tube section 1ᵃ and the expansion section 2ᵃ, joined as in Fig. 1, but the high resistance 1ᵃ only is included in the electric circuit. The expansible liquid is indicated at $f$. In this view, the chamber is supported at the joint between the two tube sections by a suitable metal support 14, which constitutes one terminal of the electric circuit. The other terminal 15, indicated as a clamp, is adjustably connected to the high resistance section and suitably connected as by a flexible conductor 16 to the electric circuit. By adjusting the terminal 15 toward and from the terminal 14, it will be evident that the length of the high resistance tube in the circuit may be varied, as desired, to vary the heating effect.

In Fig. 3, a modification $A^2$ is shown in which the high resistance tube $1^b$ is mounted in the terminals 17 and 18 to which the wires of the electric circuit are attached, and the expansible section $2^b$ of the chamber is enclosed within the high resistance section. In this view the high resistance section is closed at one end by a plug $3^b$ and is connected at its other end to the expansible section by a cap or head 19, which closes the space between the two sections. The inner end of the expansible section is closed by a plug $4^b$ and a closed space is thus formed between the tubes for containing the expansible liquid $f$. Either one of the terminals may be adjusted to vary the length of the high resistance tube in the electric circuit. A rod 7, connected to the plug $4^b$, extends outwardly through the center of the expansible section and may be utilized for operating a switch.

With this arrangement, when the current through the high resistance section causes the liquid to heat, the liquid expands and the pressure of the liquid against the plug $4^b$ causes the corrugated tube to be contracted in length and to operate the rod 7 to open a switch or perform other functions.

In Fig. 4, the arrangement of the tube sections of the thermostat $A^3$ is the reverse of that shown in Fig. 3, the corrugated section $2^c$ enclosing the high resistance section $1^c$. The high resistance section has an open end mounted in the terminal or support 21, the opposite end of said section being closed by a plug $3^c$. The corrugated tube $2^c$ is joined to the high resistance tube, adjacent the open end of the latter, by a cap or head $19^a$, which closes the space between the tubes. The plug $4^c$ closes the opposite end of the expansion tube and carries the rod 7 for operating a switch or performing other functions. The expansible liquid $f$, within the chamber, surrounds the high resistance tube and absorbs heat directly from it. In this view, I have shown means for varying the length of the high resistance tube in the electric circuit consisting of a metal rod 22, adjustably connected to a terminal 23 and provided at one end with spring contacts 24, which engage the inner face of the high resistance tube. By adjusting the rod, these contacts will engage the tube at various distances from the terminal 21, and therefore the length of tube in the circuit will be varied accordingly. When the current is sufficient to heat the high resistance tube, the heat from the latter is imparted to the surrounding liquid and the expansion of the liquid causes an expansion of the corrugated tube section.

In the forms shown in Figs. 1, 2, and 4, when the current falls and the liquid cools, a partial vacuum is formed within the closed chamber which causes the corrugated tube to contract by reason of atmospheric pressure on the outside of the tube, although this may be assisted by a spring, if desired as indicated at $s$, in Fig. 4. In Fig. 3, when the liquid cools, the corrugated tube is expanded by the formation of a partial vacuum in the chamber.

The tube sections may be arranged in various ways other than as shown and described, and the high resistance section of the chamber wall may take various forms, although the tubular form is preferred.

What I claim is:

1. An electrically operated thermostat comprising a closed chamber filled with an expansible liquid, the wall of said chamber comprising a heating section composed of a tube of high resistance metal adapted to be included in an electric circuit, and an expansible section composed of a thin annularly corrugated metal tube, one of said sections being arranged within the other.

2. An electrically operated thermostat comprising a closed chamber filled with an expansible liquid, the wall of said chamber comprising a heating section composed of a tube of high resistance metal adapted to be included in an electric circuit, and an expansible section composed of a thin annularly corrugated metal tube, the heating section being arranged within the expansion section.

3. An electrically operated thermostat comprising a closed metal chamber filled with an expansible liquid, the wall of said chamber comprising a heating section composed of a plain tube and an expansible section composed of a thin annularly corrugated tube, the plain tube being arranged within the corrugated tube, and means for including a variable part of the plain tube in an electric circuit.

In testimony whereof I affix my signature.

GEORGE H. WHITTINGHAM.